(12) United States Patent
Lee et al.

(10) Patent No.: US 8,588,834 B2
(45) Date of Patent: Nov. 19, 2013

(54) METHOD OF PERFORMING RANDOM ACCESS PROCEDURE IN MULTIPLE COMPONENT CARRIER OR AGGREGATED CARRIER SYSTEM WITH CONTENTION RESOLUTION

(75) Inventors: Young Dae Lee, Anyang-si (KR); Sung Jun Park, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 146 days.

(21) Appl. No.: 12/860,684

(22) Filed: Aug. 20, 2010

(65) Prior Publication Data
US 2011/0045863 A1 Feb. 24, 2011

Related U.S. Application Data

(60) Provisional application No. 61/236,131, filed on Aug. 23, 2009.

(51) Int. Cl.
*H04B 7/00* (2006.01)

(52) U.S. Cl.
USPC ........... 455/509; 455/450; 455/516; 455/517; 370/329

(58) Field of Classification Search
USPC .................................. 455/450, 455, 509, 515
See application file for complete search history.

(56) References Cited

U.S. PATENT DOCUMENTS

| | | | |
|---|---|---|---|
| 8,280,391 B2* | 10/2012 | Kim et al. | 455/452.1 |
| 2010/0159938 A1* | 6/2010 | Shin et al. | 455/450 |
| 2010/0273515 A1* | 10/2010 | Fabien et al. | 455/509 |
| 2010/0285809 A1* | 11/2010 | Lindstrom et al. | 455/450 |
| 2010/0322096 A1* | 12/2010 | Hsu et al. | 370/252 |
| 2011/0014922 A1* | 1/2011 | Jen | 455/450 |
| 2011/0098074 A1* | 4/2011 | Seo et al. | 455/509 |
| 2011/0286411 A1* | 11/2011 | Kim et al. | 370/329 |
| 2012/0009963 A1* | 1/2012 | Kim et al. | 455/509 |
| 2012/0076104 A1* | 3/2012 | Chun et al. | 370/329 |

OTHER PUBLICATIONS

3GPP TS 36.321 V8.2.0 3rd Generation Partnership Project; Technical Specification Group Radio Access Network; Evolved Universal Terrestrial Radio Access (E-UTRA) Medium Access Control (MAC) protocol specification (Release 8), May 2008.*

3GPP TR 36.814 V0.3.02 3rd Generation Partnership Project; Technical Specification Group Radio Access Network; Further Advancements for E-UTRA Physical Layer Aspects (Release X), Jan. 2009.*

* cited by examiner

*Primary Examiner* — Nay A Maung
*Assistant Examiner* — Alejandro Rivero
(74) *Attorney, Agent, or Firm* — McKenna Long & Aldridge LLP

(57) ABSTRACT

A method of performing a random access procedure in multiple component carrier system is provided. The method includes transmitting a random access preamble on an uplink component carrier, receiving a response to the random access preamble, transmitting an identity for the MS based on the response and monitoring a downlink component carrier linked to the uplink component carrier among a plurality of aggregated downlink component carriers. It is clear which downlink component carrier the MS needs to monitor for contention resolution.

10 Claims, 15 Drawing Sheets

FIG. 12

| Contention Resolution Identity | Oct 1 |
|---|---|
| Contention Resolution Identity | Oct 2 |
| Contention Resolution Identity | Oct 3 |
| Contention Resolution Identity | Oct 4 |
| Contention Resolution Identity | Oct 5 |
| Contention Resolution Identity | Oct 6 |

METHOD OF PERFORMING RANDOM ACCESS PROCEDURE IN MULTIPLE COMPONENT CARRIER OR AGGREGATED CARRIER SYSTEM WITH CONTENTION RESOLUTION

CROSS-REFERENCE TO RELATED APPLICATIONS

This application claims the benefit of earlier filing date and right of priority to U.S. Provisional Application No. 61/236,131, filed on Aug. 23, 2009.

BACKGROUND

1. Field of the Invention

The present invention relates to a wireless communication system, more particularly to a method of performing a random access procedure in a multiple component carrier system.

2. Related Art

Wireless communication systems are widely deployed in order to provide various kinds of communication services, such as voice and data. In general, the wireless communication systems are multiple access systems which can share available system resources (e.g., bandwidths and transmission power) and support communication with multiple users. The multiple access systems can include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

In a common wireless communication system, although the bandwidth of uplink and the bandwidth of downlink are differently set up, only one carrier is taken into consideration. Even in 3rd Generation Partnership Project (3GPP) Long Term Evolution (LTE), the number of carriers constituting uplink and downlink is 1, and the bandwidth of uplink and the bandwidth of downlink bandwidth are in general symmetrical to each other on the basis of a single carrier. However, it is not easy to allocate a large frequency bandwidth except some regions in the world. Accordingly, in order to efficiently use small sliced bands, a carrier aggregation technique for producing the same effect as that a logically large band is used by binding a plurality of physically non-continuous bands in the frequency domain is being developed. The carrier aggregation technique includes, for example, a technique in which system bandwidth of 100 MHz is supported by using multiple carriers.

A mobile station (MS) shall perform random access procedure to gain access to a network. The random access procedure is accomplished through a Random Access Channel (RACH), i.e., an uplink transmission channel. The MS transmits an initial control message (i.e. preamble) to the network through the RACH. The aim of performing the random access procedure is to obtain time synchronization between the MS and the network or to obtain radio resources for uplink transmission. There are two kinds of random access procedures. In non-contention-based random access procedure, a dedicated identifier for identifying an MS is allocated. Therefore, random access procedure can promptly be completed since contention between MSs does not occur. But resources for the dedicated identifier are needed. On the contrary, in contention-based random access procedure, an MS initiates the random access procedure without the dedicated identifier. Identifier for the MS is allocated during the random access procedure to resolve contention between MSs.

If carrier aggregation is used in the contention based random access procedure, it can be assumed that multiple uplink carriers and multiple downlink carriers are aggregated and random access resources are allocated to the multiple uplink carriers. Under this assumption, an MS can transmit multiple preambles on the multiple uplink carriers respectively. It is not clear which downlink carrier the MS needs to monitor among the multiple downlink carriers to receive its identity for contention resolution of the random access.

SUMMARY

An object of the present invention is to solve the ambiguity in receiving an identity for contention resolution by enabling a mobile station (MS) to select a downlink component carrier linked to an uplink carrier among a plurality of aggregated downlink component carriers and to receive contention resolution message from the selected downlink component carrier.

To achieve these objects and other advantages and in accordance with the purpose of the invention, a method of performing a random access procedure in a mobile communication system is provided according to an aspect of the present invention. The method includes transmitting, by a mobile station (MS), a first random access preamble on a first uplink carrier among a plurality of aggregated carriers to a base station (BS), receiving, by the MS, a response to the first random access preamble from the BS, transmitting, by the MS, an identity to the BS, the identity being based on the response to the first random access preamble, and monitoring, by the MS, a downlink carrier linked to the first uplink carrier among the plurality of aggregated carriers for contention resolution.

Preferably, the identity for the MS is either cell-radio network temporary identity (C-RNTI) for the MS or common control channel (CCCH) service data unit (SDU).

Preferably, the contention resolution message matching the identity for the MS is either layer 1 message including the C-RNTI or a medium access control (MAC) control element (CE) including the MS contention resolution identity.

Preferably, the layer 1 message is transmitted on physical downlink control channel (PDCCH) and the MAC CE is transmitted on downlink-shared channel (DL-SCH).

According to another aspect of the present invention, a method of performing a random access procedure in a mobile communication system is provided. The method includes receiving, by a base station (BS), a first random access preamble on a first uplink carrier among a plurality of aggregated carriers from a mobile station (MS), transmitting, by the BS, a response to the first random access preamble to the MS, receiving, by the BS, an identity from MS, the identity based on the response to the first random access preamble, and transmitting a contention resolution message matching the identity on a downlink carrier for contention resolution, the downlink carrier being linked to the first uplink carrier among the plurality of aggregated carriers.

According to the present invention, an MS monitors a selected downlink carrier to receive its C-RNTI on PDCCH or the Contention Resolution Identity for contention resolution of the random access. According to the present invention, even if multiple aggregated component carriers are used for random access, it is clear which downlink component carrier the MS needs to monitor for contention resolution.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

FIG. 12 is an example of the MAC control element including CR identity.

DESCRIPTION OF EXEMPLARY EMBODIMENTS

Figure 1:
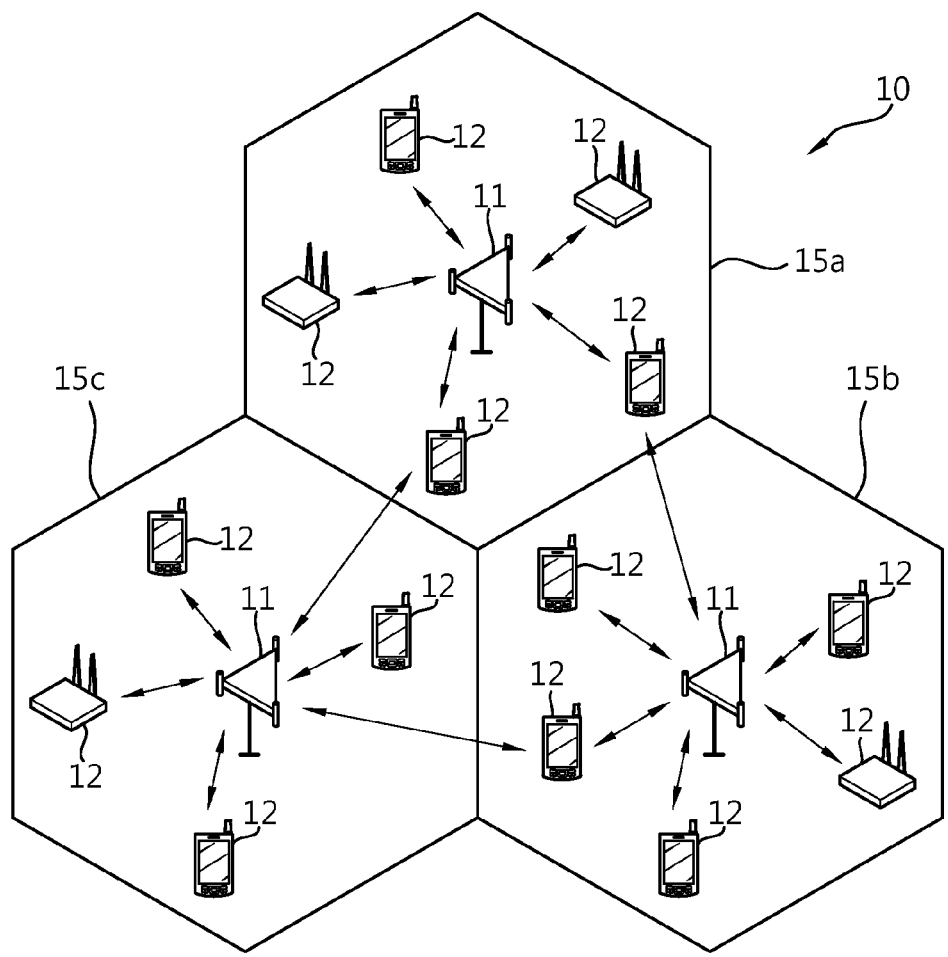
FIG. 1 is a diagram showing a wireless communication system.

Some embodiments of the present invention will now be described in detail with reference to the accompanying drawings. It is to be noted that in assigning reference numerals to respective constituent elements in the drawings, the same reference numerals designate the same constituent elements although the constituent elements are shown in different drawings. Further, in describing the embodiments of the present invention, a detailed description of pertinent known constructions or functions will be omitted if it is deemed to make the gist of the present invention unnecessarily vague.

Further, in this specification, a wireless communication network is chiefly described. However, tasks performed in the wireless communication network can be performed in a process of a network managing system (e.g., a base station), such as controlling the wireless communication network and sending data, or can be performed in a mobile station coupled to the corresponding wireless communication network.

FIG. 1 is a diagram showing a wireless communication system.

Referring to FIG. 1, a wireless communication system 10 is broadly deployed to provide various communication services such as voice, packet data.

The wireless communication system 10 includes at least one Base Station (hereinafter referred to as 'BS') 11. The BSs 11 provide communication services to respective geographical areas (in general, called 'cells') 15a, 15b, and 15c. The cell can be divided into a plurality of areas (called 'sectors').

A Mobile Station (hereinafter referred to as an 'MS') 12 can be fixed and mobile and also referred to as another terminology, such as a User Equipment (UE), a Mobile Terminal (MT), a User Terminal (UT), a Subscriber Station (SS), a wireless device, a Personal Digital Assistant (PDA), a wireless modem, or a handheld device.

The BS 11 commonly refers to a fixed station which communicates with the MSs 12, and it can be referred to as another terminology, such as an evolved-NodeB (eNB), a Base Transceiver System (BTS), or an access point(AP). The cell should be comprehensively interpreted to indicate some frequencies provided by the BS 11. The cell includes a variety of coverage areas, such as a mega cell, a macro cell, a micro cell, a pico cell, and a femto cell.

Hereinafter, downlink refers to communication from the BS 11 to the MS 12, and uplink refers to communication from the MS 12 to the BS 11. In the downlink, a transmitter can be part of the BS 11 and a receiver can be part of the MS 12. In the uplink, a transmitter can be part of the MS 12 and a receiver can be part of the BS 11.

There are no limits to multiple access schemes to which a wireless communication system is applied. A variety of multiple access schemes, such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, and OFDM-CDMA, can be used. A Time Division Duplex (TDD) method of performing uplink transmission and downlink transmission at different times or a Frequency Division Duplex (FDD) method of performing uplink transmission and downlink transmission using different frequencies can be used.

The layers of a radio interface protocol between an MS and a network can be classified into L1 (i.e., a first layer), L2 (i.e., a second layer), and L3 (i.e., a third layer) based on the three lower layers of an Open System Interconnection (OSI) reference model which is widely known in the communication system.

The physical layer belonging to the first layer provides information transfer service to a higher layer using the physical channel. The physical layer is connected to a Medium Access Control (hereinafter referred to as 'MAC') layer through a transport channel which is placed in a higher layer. Information is moved between the medium access control layer and the physical layer through the transport channel. Further, Information is moved between different physical layers (i.e., the physical layers on the transmission side and the reception side) through the physical channel. The physical channel is modulated using an OFDM (Orthogonal Frequency Division Multiplexing) method, and it uses the time and frequency as radio resources.

The MAC layer of the second layer provides service layer through a logical channel to a Radio Link Control (hereinafter referred to as 'RLC') layer which is higher than the MAC layer. The RLC layer of the second layer supports reliable data transmission. The function of the RLC layer may be implemented using a function block within the MAC layer. In such a case, the RLC layer may not exist. The PDCP layer of the second layer performs a header compression function for reducing the size of an IP packet header including relatively large and unnecessary control information so that an IP packet, such as IPv4 or IPv6, can be efficiently sent in a radio range having a small bandwidth.

A Radio Resource Control (hereinafter referred to as 'RRC') layer is related to the configuration, re-configuration, and release of a Radio Bearer (hereinafter referred to as a 'RB) and is responsible for the control of logical channels, transport channels, and physical channels. Here, the RB refers to service provided by the second layer for data transfer between an MS and an UTRAN. In the case in which RRC connection exists between the RRC of an MS and the RRC layer of a wireless network, the MS is in the RRC connected mode. In the case in which RRC connection does not exist between the RRC of an MS and the RRC layer of a wireless network, the MS is in the RRC idle mode. A Non-Access Stratum (NAS) layer placed over the RRC layer performs functions, such as session management and mobility management.

Carrier Aggregation (CA) is a type of radio configuration which provides aggregation of two or more component carriers in order to support wider transmission bandwidths up to 100 MHz. CA is also called a spectrum aggregation or a bandwidth aggregation. An individual unit carrier bound by CA is referred to as a Component Carrier or a Carrier (hereinafter referred to as a 'CC'). Each CC is defined by a bandwidth and a center frequency. The CA is used to support an increasing throughput, prevent an increase of the costs resulting from the introduction of broadband RF (radio frequency) devices, and guarantee compatibility with the existing system.

For example, assuming that 5 CCs are allocated as the granularity of a carrier unit having a bandwidth of 5 MHz, a maximum of a bandwidth of 20 MHz can be supported.

Figure 2:
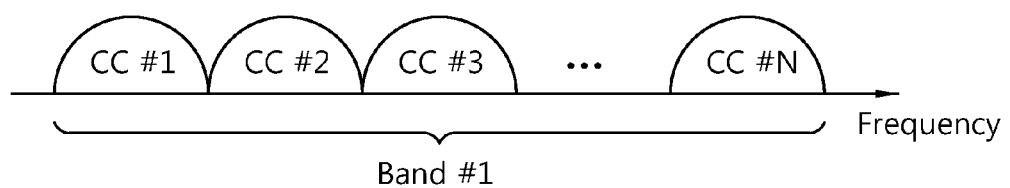
FIG. 2 is an example of the intra-band contiguous carrier aggregation
Figure 3:
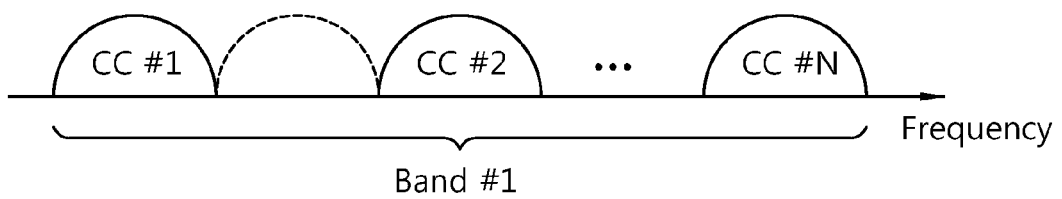
FIG. 3 is an example of the intra-band non-contiguous carrier aggregation
Figure 4:
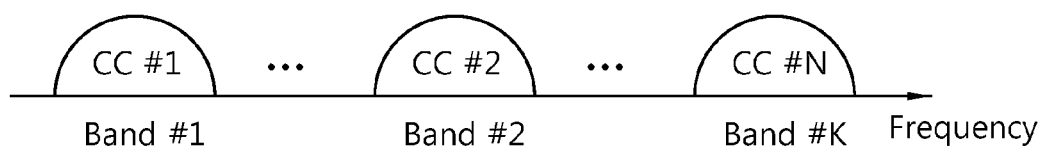
FIG. 4 is an example of the inter-band carrier aggregation.

The carrier aggregation can include the intra-band contiguous carrier aggregation such as that shown in FIG. 2, the intra-band non-contiguous carrier aggregation such as that shown in FIG. 3, and the inter-band carrier aggregation such as that shown in FIG. 4.

Referring first to FIG. 2, the intra-band contiguous carrier aggregation is performed between CCs consecutive to each other in the intra-band. For example, all CC#1, CC#2, CC#3, . . . , CC #N (i.e., aggregated CCs) are consecutive to each other.

Referring to FIG. 3, the intra-band non-contiguous carrier aggregation is performed between discontinuous CCs. For example, CC#1 and CC#2 (i.e., aggregated CCs) are spaced apart from each other with a specific frequency interposed therebetween.

Referring to FIG. 4, in the inter-band carrier aggregation, one or more of a plurality of CCs are aggregated on another frequency band. For example, a CC #1 (i.e., an aggregated CC) can exist in a band #1 and a CC #2 can exist in a band #2.

The number of aggregated downlink CCs and the number of aggregated uplink CCs can be differently configured. A case in which the number of downlink CCs is identical to the number of uplink CCs is called a symmetric aggregation, and a case in which the number of downlink CCs is different from the number of uplink CCs is called an asymmetrical aggregation.

Further, CCs can have different sizes (i.e., bandwidths). For example, assuming that 5 CCs are used to construct a 70 MHz band, the construction can include, for example, 5 MHz CC (carrier #0)+20 MHz CC (carrier #1)+20 MHz CC (carrier #2)+20 MHz CC (carrier #3)+5 MHz CC (carrier #4).

Hereinafter, a multiple carrier system refers to a system supporting the carrier aggregation. In the multiple carrier system, a contiguous carrier aggregation or a non-contiguous carrier aggregation or both can be used. Further, either a symmetrical aggregation or an asymmetrical aggregation can be used.

Figure 5:
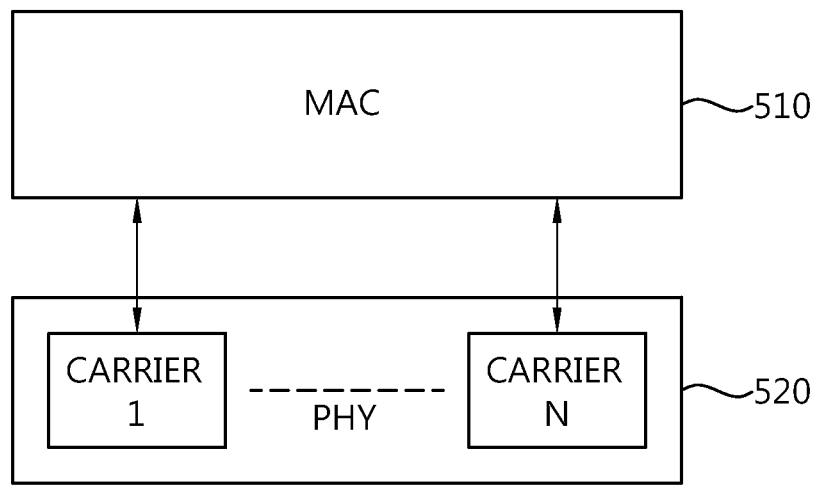
FIG. 5 is a diagram showing an example of a protocol structure for supporting multiple CCs.

FIG. 5 is a diagram showing an example of a protocol structure for supporting multiple CCs.

Referring to FIG. 5, a common MAC entity 510 manages a physical layer 520 which uses a plurality of CCs. A MAC management message transmitted through a specific CC can be applied to other CCs. That is, the MAC management message can control other CCs including the specific CCs. The physical layer 520 can be operated according to a TDD or a FDD or both.

Several physical control channels are used in the physical layer 520. A Physical Downlink Control Channel (PDCCH) used to transmit physical control information informs an MS of the resource allocation of a PCH (paging channel) and a downlink shared channel (DL-SCH) and Hybrid Automatic Repeat Request (HARQ) information related to the DL-SCH. The PDCCH also carries an uplink grant informing an MS of the allocation of resources, MCS level and uplink power control information, etc. for uplink transmission.

A Physical Control Format Indicator Channel (PCFICH) is used to inform an MS of the number of OFDM symbols used in PDCCHs and transmitted every frame. A Physical Hybrid ARQ Indicator Channel (PHICH) carries HARQ ACK/NAK signals in response to uplink transmission. A Physical Uplink Control Channel (PUCCH) carries HARQ ACK/NAK signals for downlink transmission, a scheduling request, and uplink control information such as a Channel Quality Indicator (CQI). A Physical Uplink Shared Channel (PUSCH) carries an UL-SCH (uplink shared channel).

Figure 6:
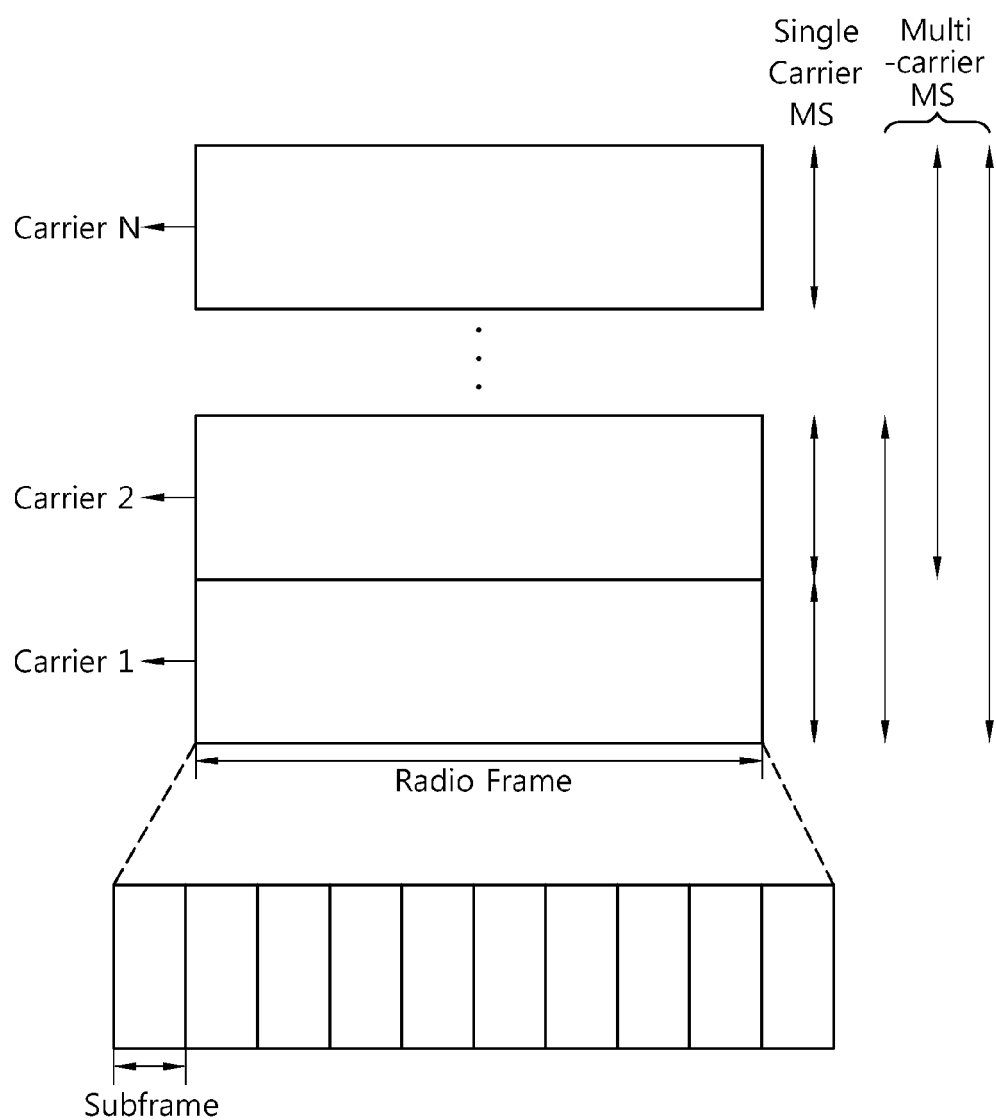
FIG. 6 is a diagram showing an example of a frame structure for a multiple component carrier operation.

FIG. 6 is a diagram showing an example of a frame structure for a multiple component carrier operation.

Referring to FIG. 6, a radio frame consists of 10 subframes. Each of the subframes includes a plurality of OFDM symbols. Each CC can have its own control channel (e.g., a PDCCH). The CCs may be contiguous to each other or may not be contiguous to each other. An MS can support one or more CCs according to its capability.

CCs can be classified into a Primary Component Carrier (hereinafter referred to as a 'PCC') and a Secondary Component Carrier (hereinafter referred to as an 'SCC') whether it is activated. The PCC is always activated, and the SCC is activated or deactivated according to specific conditions.

The term 'activation' means that traffic data are being transmitted or received or are in a ready state. The term 'deactivation' means that the transmission or reception of traffic data is impossible, but measurement or the transmission or reception of minimum information is possible.

An MS can use only one PCC or can use one or more SCCs together with the PCC. A PCC or a SCC or both can be allocated to an MS by a BS. The PCC can be used for an MS to enter a network or used to allocate an SCC or both. A carrier set to an SCC can also be changed to a PCC.

Figure 7:
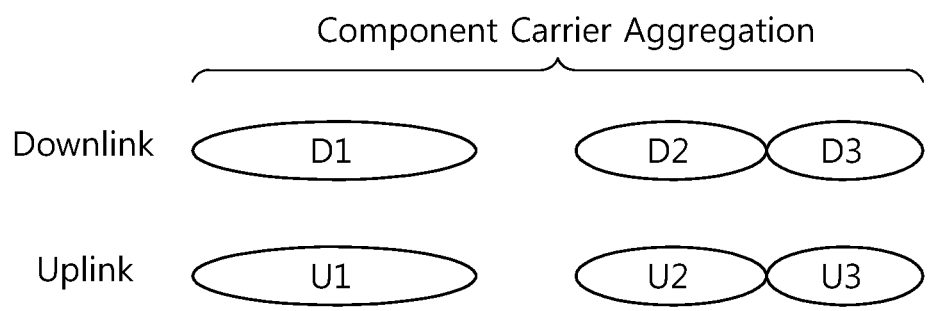
FIG. 7 is a diagram showing a linkage between a downlink component carrier and an uplink component carrier in a multiple carrier system.

FIG. 7 is a diagram showing a linkage between a downlink component carrier and an uplink component carrier in a multiple carrier system.

Referring to FIG. 7, in downlink, Downlink Component Carriers (hereinafter referred to as 'DL CC') D1, D2, and D3 are aggregated. In uplink, Uplink Component Carriers (hereinafter referred to as 'UL CC') U1, U2, and U3 are aggregated. Here, Di is an index of a DL CC, and Ui is an index of an UL CC (where i=1, 2, 3). At least one DL CC is a PCC, and the remaining DL CCs are SCCs. Likewise, at least one UL CC is a PCC and the remaining UL CCs are SCCs. For example, D1 and U1 can be PCCs, and D2, U2, D3, and U3 can be SCCs.

In an FDD system, a DL CC and an UL CC are linked to each other in a one-to-one manner. D1 is linked to U1, D2 is linked to U2, and D3 is linked to U3 in a one-to-one manner. An MS links DL CCs and an UL CC through system information transmitted by a logical channel BCCH or an RRC message dedicated for an MS, transmitted by a DCCH. Each link may be set up in a cell-specific manner or an MS-specific manner.

Examples of an UL CC linked to a DL CC are as follows.

1) UL CC through which ACK/NACK information will be transmitted by an MS with respect to data transmitted by a BS through a DL CC.

2) DL CC through which ACK/NACK information will be transmitted by a BS with respect to data transmitted by an MS through an UL CC.

3) DL CC through which a response to a Random Access Preamble (RAP) will be transmitted by a BS, the RAP being transmitted through an UL CC by an MS which starts a random access procedure.

4) UL CC to which uplink control information is applied when a BS sends uplink control information through a DL CC.

FIG. 7 illustrates only the 1:1 linkage between a DL CC and an UL CC, but a different linkage, such as 1:n or n:1, can be established. Further, the index of a CC does not always correspond to the physical order of the CC or the location of a frequency band of the corresponding CC.

In a multiple component carrier system, each idle MS can select a specific CC or cell through which radio connection between the each idle MS and a BS will be configured. For example, in the case in which radio connection to an MS is configured through a cell 2 of CC1, it may be said that the radio connection is configured through the CC1 or configured through the cell 2. Hereinafter, it is assumed that radio connection is configured in the CC dimension for consistency of description.

An MS performs random access procedure to obtain time synchronization with a network or to obtain radio resources for transmitting uplink data.

For example, an MS is going to initially access to a cell after power is turned on. To access the cell, the MS needs to obtain time synchronization for a downlink channel in order to receive system information of the cell. After receiving the system information, the MS can transmit a connection request message for an RRC connection. To obtain time synchronization, the MS has to perform random access procedure. Using the random access procedure, the MS can request radio resources for transmitting the connection request message to the cell. A base station that has received the radio resource request allocates appropriate radio resources to the MS so that the MS can transmit the connection request message.

For another example, it is assumed that a MS has an RRC connection with a base station. The base station schedules allocation of radio resource for the MS. When there are no more uplink data, the buffer of the MS is empty and the base station does not allocate uplink radio resources. It is inefficient to allocate uplink radio resources to the MS that does not use the uplink radio resources. The buffer status of the MS is reported to the network periodically or non-periodically. When new data is arrived in the buffer of the MS, the MS needs to perform random access procedure in order to obtain uplink radio resources. Using the random access procedure the MS requests radio resources to the base station.

Figure 8:
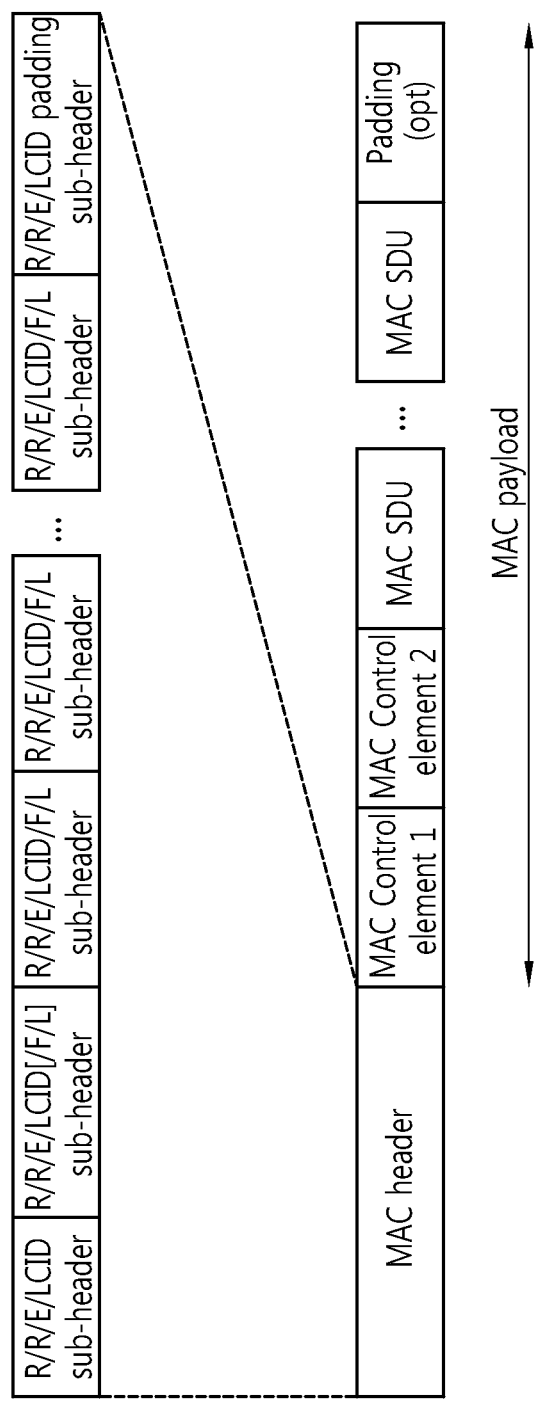
FIG. 8 is an example of a medium access control protocol data unit (MAC PDU) used for random access procedure.

FIG. 8 is an example of a medium access control protocol data unit (MAC PDU) used for random access procedure.

Referring to FIG. 8, a MAC PDU consists of a MAC header, zero or more MAC Service Data Units (MAC SDU), zero, or more MAC control elements, and optionally padding.

Both the MAC header and the MAC SDUs are of variable sizes.

A MAC header consists of one or more MAC subheaders, and each subheader corresponds to a MAC SDU, a MAC control element or padding.

Figure 9:
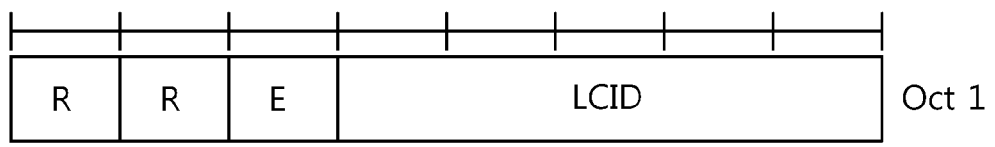
FIG. 9 is an example of the header fields in MAC PDU.

A MAC subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID as in FIG. 9. A MAC subheader corresponding to padding consists of the four header fields R/R/E/LCID.

The Logical Channel ID (LCID) field identifies the logical channel instance of the corresponding MAC SDU or the type of the corresponding MAC control element or padding. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits and the values of LCID for DL-SCH and UL-SCH are described in Table 1 and Table 2 respectively.

TABLE 1

| Index | LCID values |
| --- | --- |
| 00000 | CCCH |
| 00001-01010 | Identity of the logical channel |
| 01011-11011 | Reserved |
| 11100 | UE Contention Resolution Identity |
| 11101 | Timing Advance Command |
| 11110 | DRX Command |
| 11111 | Padding |

TABLE 2

| Index | LCID values |
| --- | --- |
| 00000 | CCCH |
| 00001-01010 | Identity of the logical channel |
| 01011-11001 | Reserved |
| 11010 | Power Headroom Report |
| 11011 | C-RNTI |
| 11100 | Truncated BSR |
| 11101 | Short BSR |
| 11110 | Long BSR |
| 11111 | Padding |

The Length (L) field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

The Format (F) field indicates the size of the Length field. There is one F field per MAC subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1 as described in Table 3.

TABLE 3

| Index | Size of Length field (in bits) |
|---|---|
| 0 | 7 |
| 1 | 15 |

The Extension (E) field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte.

The Reserved bit (R) is set to "0".

MAC subheaders have the same order as the corresponding MAC SDUs, MAC control elements and padding. MAC control elements are placed before any MAC SDU.

Figure 10:
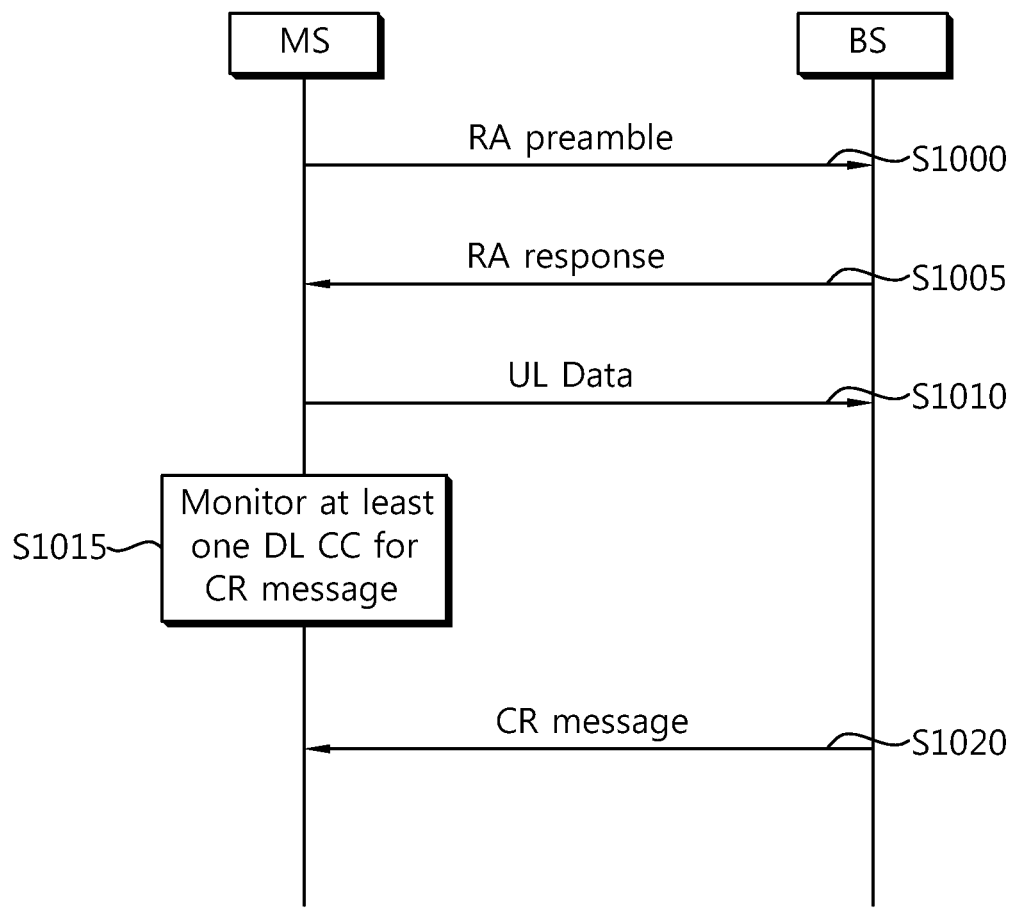
FIG. 10 is a flow diagram illustrating a method of performing random access procedure in a multiple component carrier system according to an embodiment of the present invention.

FIG. 10 is a flow diagram illustrating a method of performing random access procedure in a multiple component carrier system according to an embodiment of the present invention.

Referring to FIG. 10, an MS transmits a random access (RA) preamble on one or more uplink CCs (UL CCs) to a base station (BS) S1000. The RA preamble is also referred to as a message1. The MS selects the RA preamble among a set of RA preambles and radio resources for a Physical Random Access Channel (PRACH) based on system information. The RA preamble is transmitted on the PRACH.

The BS transmits a random access (RA) response to the MS as a response to the RA preamble on one or more downlink CCs (DL CCs) S1005. The RA response is also referred to as a message2. The RA response includes time advance information and scheduling information on radio resource allocation for uplink (UL) data. In addition, the RA response may contain a temporary Cell-Radio Network Temporary Identity (C-RNTI). A C-RNTI is used as an identifier of the MS in UTRAN/E-UTRAN. The C-RNTI is an identifier for identifying an MS within a cell, and the BS is in charge of allocating and withdrawing the identifier.

Figure 11:
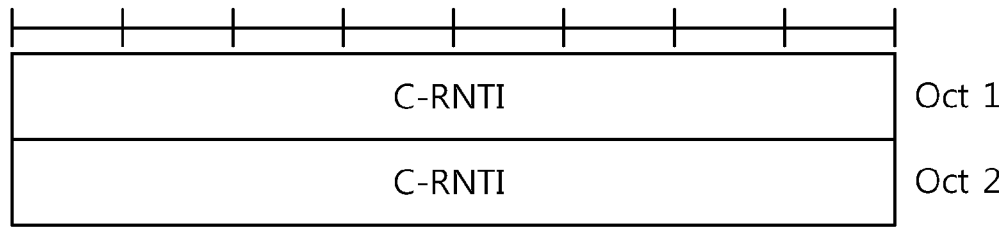
FIG. 11 is an example of the MAC control element including C-RNTI.

The MS transmits UL data such as an RRC connection request message on one or more UL CCs, based on information on radio resource allocation contained in the RA response S1010. The UL data is also referred to as a message3. The UL data includes C-RNTI MAC control element as described in FIG. 11 or common control channel SDU (CCCH SDU) as a unique identifier. Referring to FIG. 11, a C-RNTI MAC control element is identified by MAC subheader with LCID. It has a fixed size and consists of a single field. C-RNTI field contains the C-RNTI of the MS.

Referring back to FIG. 10, the MS monitors at least one DL CC on which the MS receives a contention resolution (CR) message from the BS S1015.

In an embodiment, the MS monitors a single DL CC among aggregated DL CCs to receive one CR message on either one PDCCH channel or one DL SCH channel of the single DL CC. The single DL CC is either linked or unlinked to the UL CC on which the RA preamble is sent. For example, if the RA preamble is transmitted on a UL CC1 which is linked to a DL CC1, then the MS only monitors the DL CC1 to receive the CR message. Then, the MS decides if the contention resolution is successful for the monitored DL CC.

In another embodiment, if there are aggregated DL CCs, the MS monitors the aggregated DL CCs to receive a plurality of CR messages. And the MS receives the plurality of CR messages on either PDCCH channels or DL SCH channels from the aggregated DL CCs. Then, the MS decides if contention resolution is successful for each DL CC.

After receiving the UL data from the MS, the BS transmits a CR message to the MS on one or more DL CCs S1020. The CR message may contain either the C-RNTI or a contention resolution (CR) identity matching the CCCH SDU. The MAC control element including the CR identity is described in FIG. 12. Referring to FIG. 12, CR identity MAC control element is identified by MAC subheader with LCID. This control element has a fixed 48-bit size and consists of a single field, the Contention Resolution Identity and this field contains the CCCH SDU.

Referring back to FIG. 10, the MS decides if the CR message includes the C-RNTI or the CR identity to decide whether the contention resolution (CR) is successful or unsuccessful as follows:

1) Successful CR

In case that the UL data includes the C-RNTI MAC control element, if this random access procedure was initiated by the MAC sublayer itself and the PDCCH transmission is addressed to the C-RNTI, or if this random access procedure was initiated by a PDCCH order and the PDCCH transmission is addressed to the C-RNTI, the MS decides the contention resolution is successful.

In case that the UL data includes the CCCH SDU and the PDCCH transmission is addressed to its Temporary C-RNTI, if the CR identity included in the MAC control element matches the CCCH SDU in the UL data, the MS decides the contention resolution is successful.

2) Unsuccessful CR

If the MS does not receive its C-RNTI on PDCCH or if the CR identity included in the MAC control element does not match the CCCH SDU in the UL data, the UE decides the contention resolution is unsuccessful.

Figure 13:
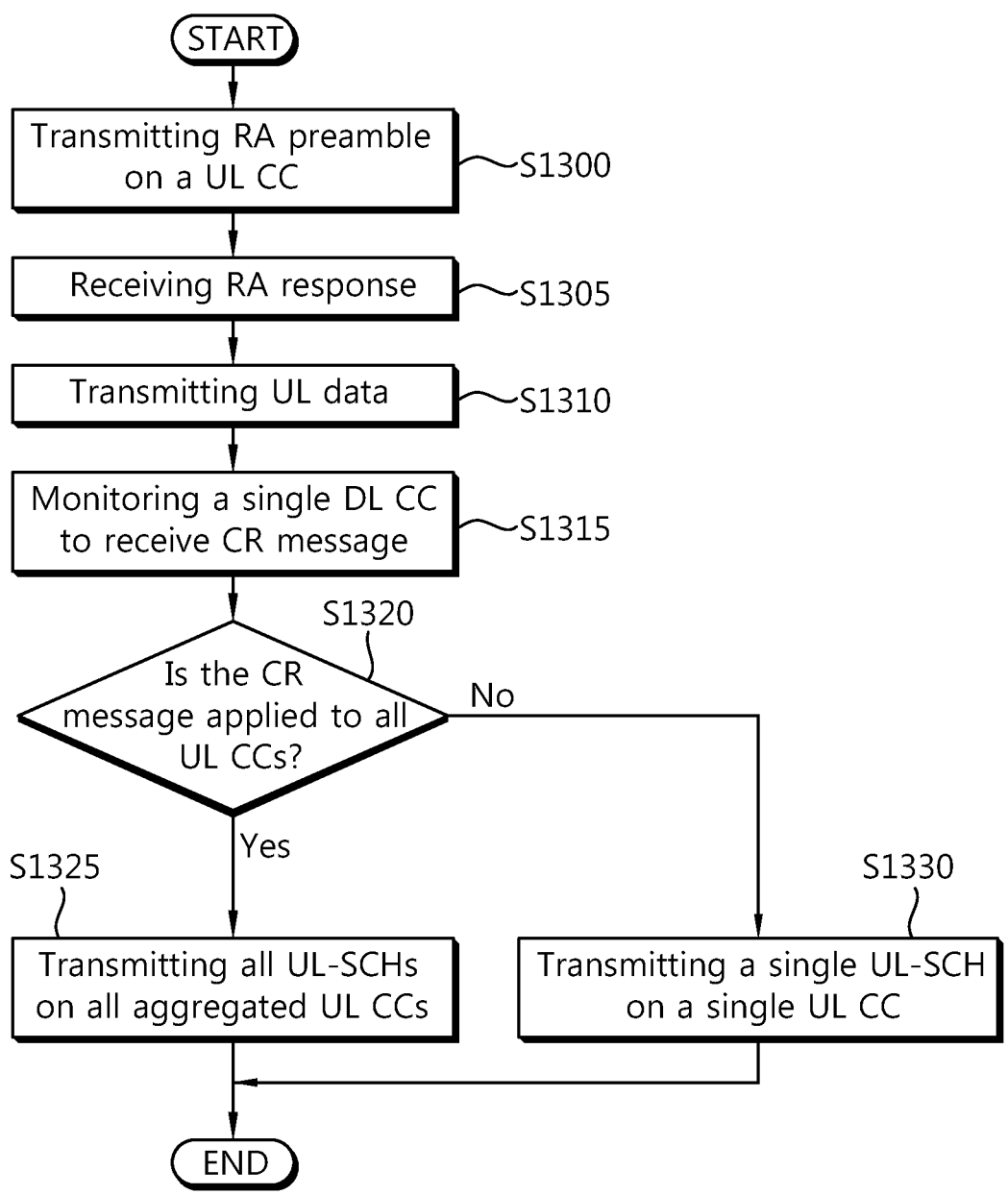
FIG. 13 is a flow diagram illustrating the method of performing random access procedure by an MS according to an embodiment of the present invention.

FIG. 13 is a flow diagram illustrating the method of performing random access procedure by an MS according to an embodiment of the present invention. This flow diagram is a case where the MS monitors a single DL CC for receiving CR message from a BS and CR is successful.

Referring to FIG. 13, an MS transmits a RA preamble on a UL CC to a BS S1300. The MS receives a RA response from the BS as a response to the RA preamble on a DL CC S1305.

The MS transmits UL data such as an RRC connection request message, based on information on radio resource allocation contained in the RA response on the UL CC S1310.

The MS monitors a single DL CC among a plurality of aggregated DL CCs until it receives a CR message from the BS S1315. In an embodiment, the single DL CC is linked to the UL CC on which the RA preamble was transmitted. For example, if the RA preamble was transmitted on UL CC1, the single DL CC is DL CC1 which is linked to the UL CC1.

In another embodiment, the single DL CC is one of the aggregated DL CCs and is not linked to the UL CC on which the RA preamble was transmitted. For example, if the RA preamble was transmitted on UL CC1, the single DL CC is DL CC2 which is not linked to the UL CC1.

The MS decides if the CR message transmitted on the single DL CC is applied to all aggregated UL CCs S1320.

If the CR message is applied to all aggregated UL CCs, then the MS transmits all UL-SCH on the all aggregated UL CCs when the MS has UL grants for all the aggregated UL CCs S1325. This is because the CR message is sent for all the aggregated UL CCs.

If the CR message is not applied to all aggregated UL CCs, but selectively indicates a single UL CC where CR is successful, the MS transmits a single UL-SCH on the single UL CC S1330. For example, if two UL data are transmitted on UL CC1 and UL CC2 respectively and the CR message only indicates UL CC1 where CR is successful, the UL data that was transmitted on the UL CC2 can be transmitted again on the UL CC1.

Figure 14:
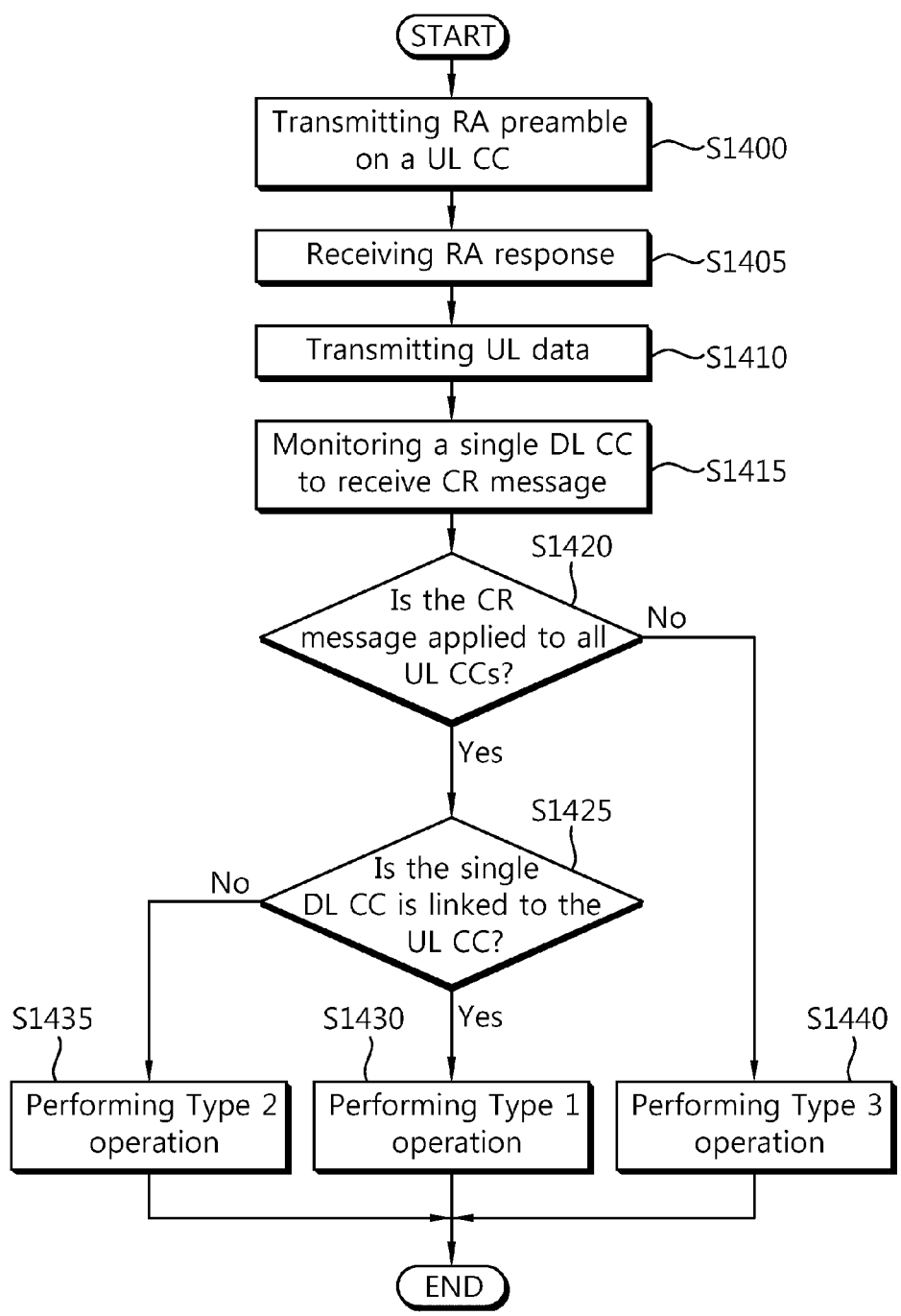
FIG. 14 is a flow diagram illustrating the method of performing random access procedure by an MS according to another embodiment of the present invention.

FIG. 14 is a flow diagram illustrating the method of performing random access procedure by an MS according to another embodiment of the present invention. This flow diagram is a case where the MS monitors a single DL CC for receiving CR message from a BS and CR is unsuccessful. Referring to FIG. 14, an MS transmits a RA preamble on a UL CC to a BS S1400. The MS receives a RA response from the BS as a response to the RA preamble on a DL CC S1405.

The MS transmits UL data such as an RRC connection request message, based on information on radio resource allocation contained in the RA response on the UL CC S1410.

The MS monitors a single DL CC among a plurality of aggregated DL CCs until it receives a CR message from the BS S1415.

The MS decides if the CR message transmitted on the single DL CC is applied to all aggregated UL CCs S1420.

If the CR message is applied to all aggregated UL CCs, then the MS decides if the single DL CC that the MS monitored is linked to the UL CC on which the preamble was transmitted S1425.

If the single DL CC is linked to the UL CC on which the preamble was transmitted, the MS performs one of the following type 1 operations because the CR is unsuccessful S1430.

(1) The MS retransmits an RA preamble on the UL CC on which the MS previously transmitted a RA preamble.

(2) The MS retransmits an RA preamble on a randomly selected UL CC of all aggregated UL CCs or on a UL CC selected according to a preamble selection rule. For instance, based on the preamble selection rule, the MS may select UL CC1 because UL CC1 has a higher priority than UL CC2.

(3) The MS retransmits a plurality of RA preambles on all aggregated UL CCs.

Back in step S1425, if the single DL CC is not linked to the UL CC on which the preamble was transmitted, the MS performs one of the following type 2 operations S1435. The type 2 operations (1) through (3) are the same with the type 1 operations.

(1) The MS retransmits an RA preamble on the UL CC on which the MS previously transmitted a RA preamble.

(2) The MS retransmits an RA preamble on a randomly selected UL CC of all aggregated UL CCs or on a UL CC selected according to a preamble selection rule. For instance, based on the preamble selection rule, the MS may select UL CC1 because UL CC1 has a higher priority than UL CC2.

(3) The MS retransmits a plurality of RA preambles on all aggregated UL CCs.

(4) The MS retransmits an RA preamble on the UL CC linked to the single DL which the UE monitored most recently.

Back in step S1420, if the CR message is not applied to all aggregated UL CCs, which means the CR message selectively indicates one or more UL CCs for which CR is successful, the MS performs one of the following type 3 operations S1440. For convenience in explanation, assume that there are two aggregated DL CCs (DL CC1 and DL CC2) and CR for DL CC1 is successful, but CR for DL CC2 is unsuccessful.

(1) The MS transmits UL-SCH #1 on UL CC1 which is linked to the DL CC1. This is because CR for DL CC1 is successful.

(2) The MS retransmits an RA preamble on UL CC1 which is linked to the DL CC1 because CR for UL CC2 is unsuccessful.

(3) The MS retransmits an RA preamble on the UL CC(s) that the MS previously transmitted the RA preamble(s). For example, if the MS previously transmitted an RA preamble on UL CC1, the MS retransmits an RA preamble on UL CC1.

(4) The MS retransmits two RA preambles on the two UL CCs. This is re-trials of random access on the two UL CCs because CR is not successful on one UL CC.

(5) The MS transmits UL-SCH #1 on UL CC1 and retransmits a RA preamble on UL CC2. This is a re-trial of random access on UL CC2 only. This is because CR is not successful for UL CC2.

(6) The MS transmits UL-SCH #1 on UL CC1 only and stops any transmission on UL CC2. Then, what the MS unsuccessfully transmitted on UL-SCH #2 on UL CC2 will be transmitted again on UL-SCH #1 on UL CC1. This is because CR is not successful on UL CC2.

Figure 15:
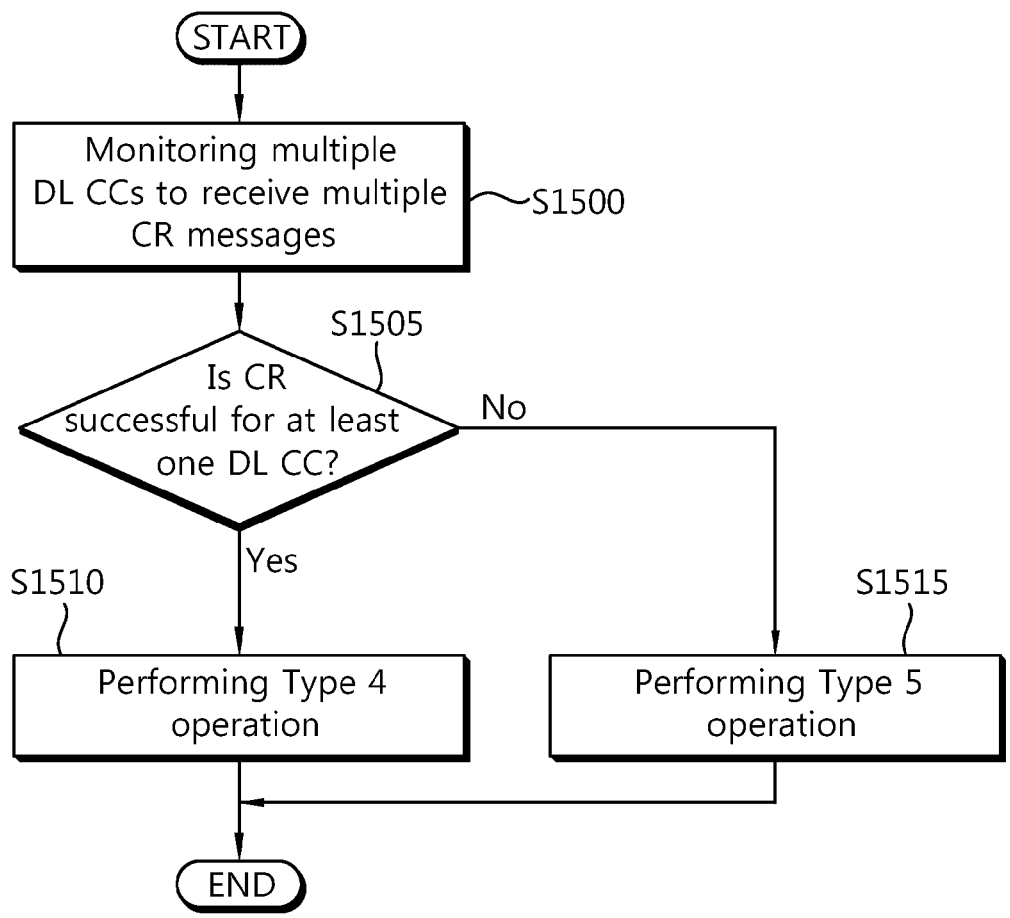
FIG. 15 is a flow diagram illustrating the method of performing random access procedure by an MS according to yet another embodiment of the present invention.

FIG. 15 is a flow diagram illustrating the method of performing random access procedure by an MS according to yet another embodiment of the present invention. This flow diagram is a case where the MS monitors multiple DL CCs for receiving multiple CR messages from a BS.

Referring to FIG. 15, an MS monitors multiple DL CCs for receiving multiple CR messages from a BS S1500. There are aggregated UL CCs and aggregated DL CCs. And each UL CC is linked to a DL CC respectively. It is assumed that the MS already transmitted an RA preamble and received an RA response before monitoring.

The MS decides if CR is successful for at least one DL CC among the multiple DL CCs S1505.

If the MS finds that CR is successful for at least one DL CC among the multiple DL CCs, then the MS performs one of the following type 4 operations S1510 (For convenience in explanation, assume that there are two aggregated DL CCs (DL CC1 and DL CC2), DL CC1 is linked to UL CC1 and DL CC2 is linked to UL CC2, and CR for DL CC1 is successful, but CR for DL CC2 is unsuccessful). The type 4 operations (1) through (6) are the same with the type 3 operations.

(1) The MS transmits UL-SCH #1 on UL CC1. This is because CR for DL CC1 which is linked to UL CC1 is successful.

(2) The MS retransmits an RA preamble on UL CC1. This is because CR for UL CC2 is not successful.

(3) The MS retransmits an RA preamble(s) either one of the UL CC1 and UL CC2 or both of them that the MS previously transmitted an RA preamble(s). For example, if the MS previously transmitted a RA preamble on UL CC1 only, the MS retransmits an RA preamble on UL CC1 again. For another example, if the MS previously transmitted RA preambles on UL CC1 and UL CC2, the MS retransmits RA preambles on UL CC1 and UL CC2 again.

(4) The MS retransmits all RA preambles on the all UL CCs respectively. This is re-trials of random access on all UL CCs because CR is not successful on one UL CC.

(5) The MS transmits UL-SCH #1 on UL CC1 and retransmits an RA preamble on UL CC2. This is a re-trial of random access on UL CC2 only. This is because CR is not successful on UL CC2.

(6) The MS transmits UL-SCH #1 on UL CC1 only and stops any transmission on UL CC2. Then, what the MS unsuccessfully transmitted on UL-SCH #2 on UL CC2 will be transmitted again on UL-SCH #1 on UL CC1. This is because CR is not successful on UL CC2.

(7) The MS does not continue to verify if CR is successful for the other DL CCs i.e. the MS stops receiving any CR message on the other DL CCs.

(8) The MS transmits a UL-SCH on UL CC#n linked to DL CC#n for which CR was successful and the MS stops any transmission on the other UL CCs. This is when each CR was transmitted only for each UL CC i.e. each CR corresponds to each carrier only.

(9) The MS transmits two UL-SCHs on two UL CCs. This is when the CR is applied to both UL CCs i.e. each CR corresponds to all UL CCs.

Back in step S1505 again, if the MS finds that CR is not successful for at least one DL CC among the multiple DL CCs, which means CR is unsuccessful for all multiple DL CCs, then the MS performs one of the following type 5 operations S1515:

(1) The MS retransmits an RA preamble(s) on a UL CC(s) on which the MS previously transmitted a RA preamble(s).

(2) The MS retransmits an RA preamble on a randomly selected UL CC of all aggregated UL CCs or on a UL CC selected according to a preamble selection rule. For instance, based on the preamble selection rule, the MS may select UL CC1 because UL CC1 has a higher priority than UL CC2.

(3) The MS retransmits multiple RA preambles on all the multiple UL CCs.

The aforementioned functions can be executed by processors such as microprocessors, controllers, microcontrollers, application specific integrated circuits (ASICs) and so on according to software or program codes coded to execute the functions. The design, development and implementation of the codes are obvious to those skilled in the art.

While the present invention has been particularly shown an described with reference to exemplary embodiments thereof, it will be understood by those of ordinary skill in the art that various changes in form and details may be made therein without departing from the spirit and scope of the present invention as defined by the following claims.

What is claimed is:

1. A method of performing a random access procedure in a mobile communication system, the method comprising:
    transmitting, by a mobile station (MS), a first random access preamble on at least one first uplink component carrier among a plurality of aggregated uplink component carriers to a base station (BS);
    receiving, by the MS, a random access response as a response to the first random access preamble on at least one downlink component carrier among a plurality of aggregated downlink component carriers from the BS;
    transmitting, by the MS, an uplink data on the at least one first uplink component carrier based on information on radio resource allocation contained in the random access response to the BS, the uplink data including an identity of the MS;
    monitoring, by the MS, the plurality of aggregated downlink component carriers for contention resolution;
    receiving a plurality of contention resolution messages on the plurality of aggregated downlink component carriers from the BS;
    deciding whether the contention resolution is successful or not for all of the plurality of aggregated downlink component carriers, wherein it is decided that the contention resolution is successful for a specific downlink component carrier if the contention resolution message on the specific downlink component carrier matches with the identity of the MS, wherein the specific downlink component carrier is being linked to the at least one first uplink component carrier among the plurality of aggregated uplink component carriers; and
    transmitting, by the MS, a second random access preamble on at least one second uplink component carrier, which has a higher priority than other uplink component carriers according to a preamble selection rule, among the plurality of aggregated uplink component carriers to the BS if the contention resolution is unsuccessful for all of the plurality of aggregated downlink component carriers.

2. The method of claim 1, wherein the identity is a cell-radio network temporary identifier (C-RNTI) in a medium access control (MAC) control element (CE).

3. The method of claim 1, wherein the identity is a common control channel (CCCH) service data unit (SDU) in a medium access control (MAC) control element (CE).

4. The method of claim 1, wherein the contention resolution is based on a cell-radio network temporary identifier (C-RNTI) on a physical downlink control channel (PDCCH) of the monitored multiple downlink component carriers.

5. The method of claim 1, wherein the contention resolution is based on a contention resolution identity for the MS on a downlink shared channel (DL-SCH) of the monitored multiple downlink component carriers.

6. A method of performing a random access procedure in a mobile communication system, the method comprising:
    receiving, by a base station (BS), a first random access preamble on at least one first uplink component carrier among a plurality of aggregated uplink component carriers from a mobile station (MS);
    transmitting, by the BS, a random access response as a response to the first random access preamble on at least one downlink component carrier among a plurality of aggregated downlink component carriers to the MS;
    receiving, by the BS, an uplink data on the at least one first uplink component carrier based on information on radio resource allocation contained in the random access response from the MS, the uplink data including an identity of the MS;
    transmitting a plurality of contention resolution messages on the plurality of aggregated downlink component carriers to the MS for contention resolution,
    wherein the plurality of aggregated downlink component carriers are monitored by the MS for contention resolution, wherein the contention resolution is decided by the MS whether the contention resolution is successful or not for all of the plurality of aggregated downlink component carriers, wherein it is decided that the contention resolution is successful for a specific downlink component carrier if the contention resolution message on the specific downlink component carrier matches with the identity of the MS, wherein the specific downlink component carrier is being linked to the at least one first uplink component carrier among the plurality of aggregated uplink component carriers; and
    receiving, by the BS, a second random access preamble on at least one second uplink component carrier, which has a higher priority than other uplink component carriers according to a preamble selection rule, among the plurality of aggregated uplink component carriers from the MS if the contention resolution is unsuccessful for all of the plurality of aggregated downlink component carriers.

7. The method of claim 6, wherein the identity is a cell-radio network temporary identifier (C-RNTI) in a medium access control (MAC) control element (CE).

8. The method of claim 6, wherein the identity is a common control channel (CCCH) service data unit (SDU) in a medium access control (MAC) control element (CE).

9. The method of claim 6, wherein the contention resolution is based on a cell-radio network temporary identifier (C-RNTI) on a physical downlink control channel (PDCCH) of the multiple downlink component carriers.

10. The method of claim 6, wherein the contention resolution is based on a contention resolution identity for the MS on a downlink shared channel (DL-SCH) of the multiple downlink component carriers.

* * * * *